UNITED STATES PATENT OFFICE.

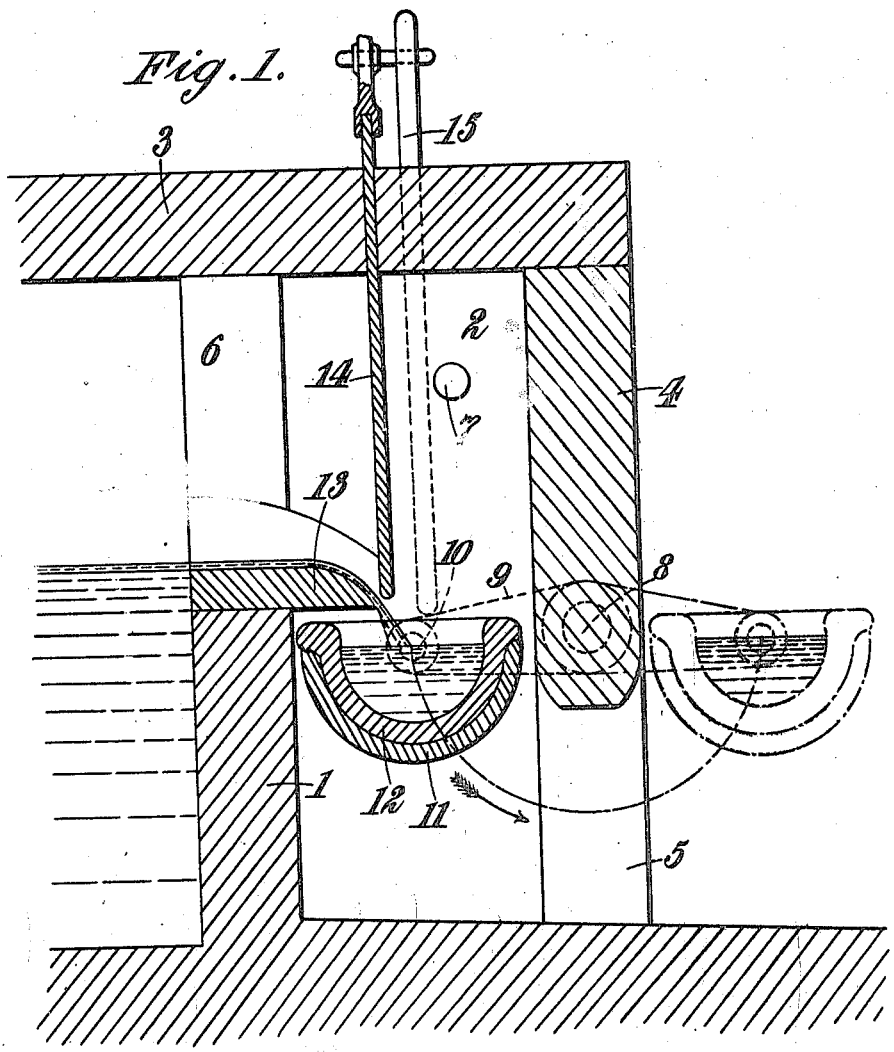

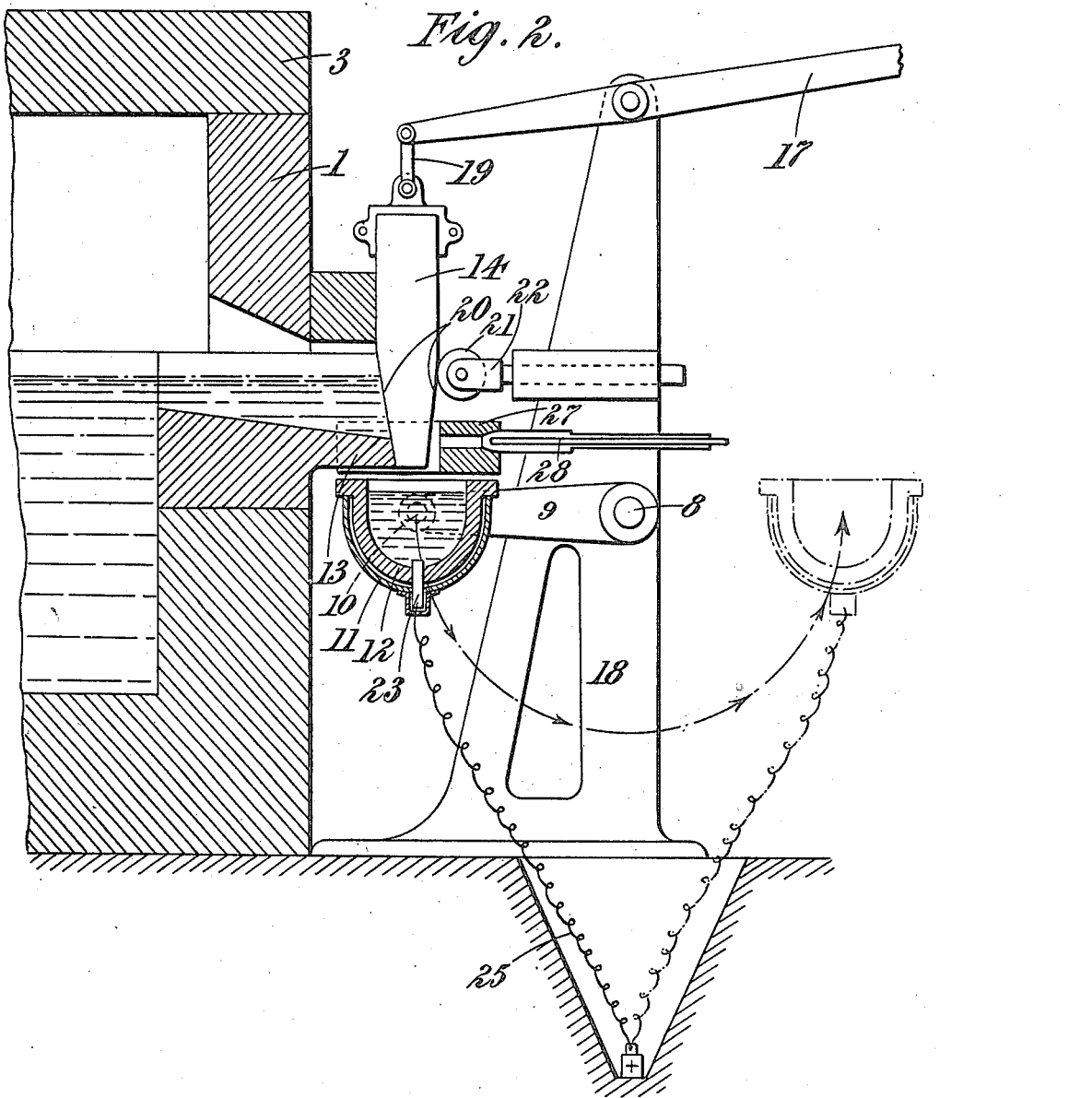

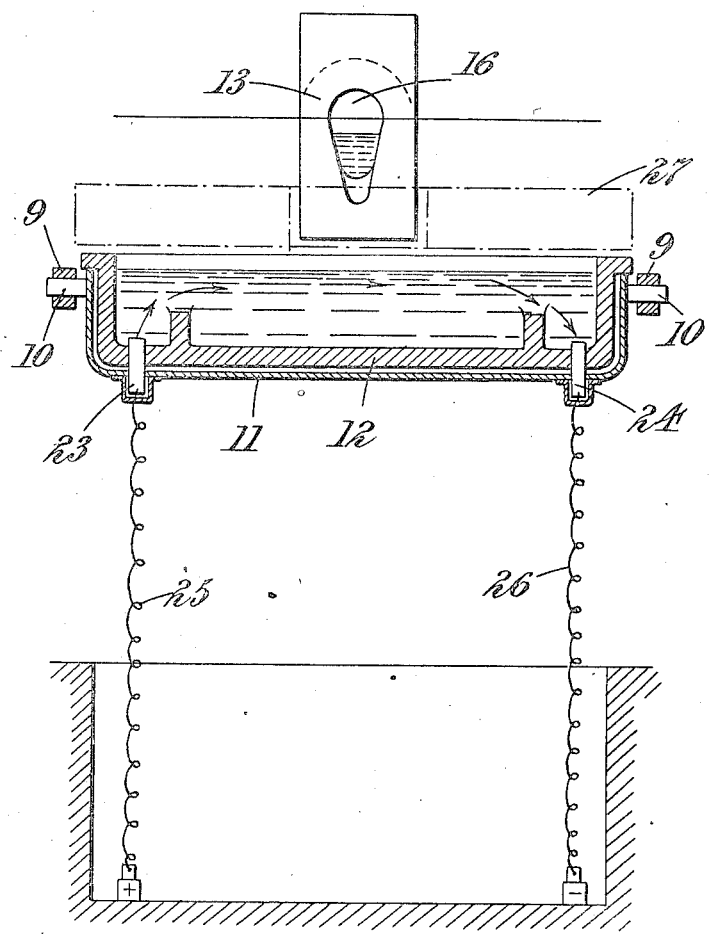

EMILE ROIRANT, OF ST. OUEN, FRANCE, ASSIGNOR TO ARTHUR WILZIN, OF ST. OUEN, FRANCE.

GLASS DELIVERING AND MELTING APPARATUS.

1,307,150. Specification of Letters Patent. Patented June 17, 1919.

Application filed August 13, 1918. Serial No. 249,706.

*To all whom it may concern:*

Be it known that I, EMILE ROIRANT, a citizen of the Republic of France, and resident of St. Ouen, Seine, France, have invented new and useful Improvements in or Relating to Glass Delivering and Melting Apparatus, of which the following is a specification.

This invention relates to improvements in glass delivering and melting apparatus, and it has for its object to provide means for collecting molten glass from a glass container, such, for example, as the furnace in which it is melted, and delivering it to a gathering device arranged at a distance from the said glass container.

It also has for its object to provide means whereby the glass is kept hot while it is being poured from the container and transporting it to the collecting point without substantial cooling, and thus preventing the difficulties due thereto.

According to the present invention, apparatus for delivering molten glass to gathering apparatus comprises, in combination, a glass container having a discharge for the molten glass, a glass receiving receptacle, and means to reciprocate the said receptacle from under the discharge from the glass container to the gathering point and back again.

The means for maintaining the glass hot during pouring from the glass container may comprise means for directly heating the glass, together with a screen arranged in front of the discharge from the said container over the receiving receptacle, or the screen may be replaced by a supplementary chamber arranged in front of the glass container and inclosing the discharge therefrom, which chamber may be heated, whereby the glass is maintained heated indirectly during the pouring operation.

Forms of apparatus according to the present invention will now be described with reference to the accompanying drawing, in which—

Figure 1 shows in section the end of a glass melting furnace having means for maintaining the glass hot during the pouring operation, comprising a supplementary heated chamber arranged in front of the furnace and inclosing the discharge from the furnace;

Fig. 2 shows in section a glass melting furnace in which the supplementary chamber is replaced by a screen arranged over the glass receiving receptacle at the discharge from the furnace and means are provided for heating the glass directly by passing an electric current through it; and Fig. 3 shows in section a front elevation of the receiving receptacle shown in Fig. 2.

Like letters refer to like parts throughout the drawings.

Referring to Fig. 1.

In front of the front wall 1 of the furnace is provided a supplementary chamber 2 which is constituted by the top of furnace 3 extending over the front wall 1 of the furnace and a depending extension 4. The front wall 4 of the supplementary chamber is provided at the bottom with an opening 5, and an opening 6 is or may be provided in the front wall 1 of the furnace connecting the furnace and the supplementary chamber, whereby the hot gases from the furnace pass or may pass into the said chamber and thus heat it. Or gas burners 7 may be provided within the said chamber for this purpose.

Carried on a shaft 8 extending across the front wall of the furnace are arms 9 between which is pivoted at 10 the collecting receptacle for the molten glass, comprising a metallic casing or holder 11 having a lining of any suitable refractory material 12. The width and length of the collecting receptacle 11, 12 are approximately the same as the corresponding dimensions of the chamber 2, the receptacle being wide enough to catch the overflow from lip 13 from the furnace.

A gate 14 is provided for closing the discharge from the furnace when the collecting receptacle 11, 12 is not in position under the discharge lip. The gate is connected to a rod 15 which is supported in the top 3 of the furnace, and which at its lower end is adapted to come into contact with one arm 9 carrying the collecting receptacle.

Any suitable means may be provided for revolving the shaft, as, for example, a handle keyed to it so that the collecting receptacle may be moved into the chamber 2 under the discharge lip or outside the chamber to the position where gathering is effected, as shown in dotted lines in the drawing.

The operation of the apparatus is as follows:—

To receive a charge of glass the collecting receptacle 11, 12 is moved into the supplementary chamber 2 under the discharge lip 13 of the furnace, and when it nearly reaches its position one of the arms 9 comes into contact with the rod 15, thus raising it and opening the gate 14, whereby glass is allowed to flow from the furnace into the collecting receptacle. When a sufficient charge has passed from the furnace, the shaft 8 is revolved so as to carry the arms 9 and the depending collecting receptacle 11, 12 outside the supplementary chamber 2 to the position shown in dotted lines. When this movement takes place the gate 14 falls and closes the discharge of the furnace.

Conveniently arranged stops (not shown in the drawing) may be provided to limit the angular movement of the collecting receptacle 11, 12.

With the apparatus, according to the present invention, the time of exposure of the glass to the atmosphere before it is gathered is very short, so that cooling is largely obviated; the capacity of the gathering receptacle may be reduced with the result that the charge of glass is more frequently renewed, and the supplementary chamber is narrow and may therefore be easily heated; also, since the discharge of the glass from the furnace need only take place from time to time, the flow, whenever it takes place, may be sufficient to prevent clogging.

The glass not gathered from the collecting receptacle is returned to the supplementary chamber, where it is kept hot and molten until required.

Referring to Figs. 2 and 3, the front of the furnace 1 is provided with an orifice 16 through which the molten glass is discharged. The orifice is closed by a gate 14 which is moved vertically by the lever 17 pivoted to the standard 18 and connected to the gate by the link 19. The gate is formed at its lower end with two inclined surfaces 20 so as to form a wedge which is forced against the discharge orifice 16 to form a tight closure, by a roller 21 carried by an adjustable fork 22 on the standard 18.

The glass receiving receptacle 11, 12 is provided at each end at the bottom with an electrode 23 and 24 to which are connected the conducting cables 25 and 26 from a convenient source of electricity.

In front of the furnace a screen 27 of refractory material is arranged which extends over the receiving receptacle when it is in position under the discharge orifice 16. A gas burner 28 is arranged to act through the screen 27 and directed on to the discharge orifice 16, so that the glass may be heated as it is discharged from the furnace into the receiving receptacle.

The operation of the modified form of apparatus shown in Figs. 2 and 3 is exactly the same as the operation of the apparatus shown in Fig. 1. The receiving receptacle 11, 12 is moved into position under the discharge orifice 16 from the furnace, the gate 14 is opened and the receiving receptacle is filled. The gate 14 is then closed and the receiving receptacle swung to the position shown in dotted lines, where it is in front of the gathering apparatus.

During this period an electric current may be passed through the glass, which is a conductor when hot, to maintain the temperature at the required point.

It is to be understood that various modifications may be made in the present invention and that details of the construction of the apparatus may be modified without departing from this invention.

What I claim is:—

1. Apparatus for delivering molten glass to gathering apparatus comprising in combination a glass container having a discharge for the molten glass, a glass receiving receptacle and means to reciprocate the said receptacle in a vertical plane from under the discharge from the glass container to the gathering point and back again.

2. Apparatus for delivering molten glass to gathering apparatus comprising in combination a glass container having a discharge for the molten glass, a glass receiving receptacle, means to reciprocate the said receptacle in a vertical plane from under the discharge from the glass container to the gathering point and back again, and electrical means for maintaining the glass in the receiving receptacle hot, in any position of the latter.

3. Apparatus for delivering molten glass to gathering apparatus comprising in combination a glass container having a discharge for the molten glass, a glass receiving receptacle pivoted on arms arranged to reciprocate the said receptacle in a vertical plane from under the discharge from the glass container to the gathering point and back again.

4. Apparatus for delivering molten glass to gathering apparatus comprising in combination a glass container having a discharge for the molten glass, a glass receiving receptacle pivoted on arms arranged to reciprocate the said receptacle in a vertical plane from under the discharge from the glass container to the gathering point and back again, and means for maintaining the glass in the receiving receptacle hot, in any position of the latter.

5. Apparatus for delivering molten glass at the gathering point comprising in combination a glass container having a discharge for the molten glass, a glass receiving receptacle pivoted on arms arranged to reciprocate said receptacle in a vertical plane from under the discharge of the glass container to the gathering point and back again, and two electrodes disposed one at each end of the glass receiving receptacle connected to the source of electricity adapted to keep the glass at its proper temperature.

6. The combination with a glass conveying device, interposed between a molten glass container and a gathering apparatus, of means for sending and maintaining electric current through the molten glass contained in the conveyer, in any position of the latter.

7. The combination with a container for molten glass, of a glass receiving receptacle of elongated form, and means to reciprocate said receptacle toward and way from said glass container, and for maintaining the various positions of said receptacle parallel with one another.

8. The combination with a container for molten glass, of a glass receiving receptacle of elongated form, and means to reciprocate said receptacle toward and away from said glass container, in a vertical plane at right angles to the major dimension of said elongated receptacle.

9. The combination with a container for molten glass, of a glass receiving receptacle of elongated form, means to reciprocate said receptacle toward and away from said glass container, in a vertical plane at right angles to the major dimension of said elongated receptacle, and means for electrically heating the contents of the receptacle in any position of the latter.

Dated this 10th day of July, 1918.

EMILE ROIRANT.